(12) United States Patent
Taheri et al.

(10) Patent No.: US 11,500,255 B2
(45) Date of Patent: Nov. 15, 2022

(54) VARIABLE TRANSMISSION OPTICAL ASSEMBLY HAVING A PIXELATED SWITCHABLE BIREFRINGENT LAYER

(71) Applicant: ALPHAMICRON INCORPORATED, Kent, OH (US)

(72) Inventors: Bahman Taheri, Shaker Heights, OH (US); Pedro Coutino Soto, Kent, OH (US)

(73) Assignee: ALPHAMICRON INCORPORATED, Kent, OH (US)

( * ) Notice: Subject to any disclaimer, the term of this patent is extended or adjusted under 35 U.S.C. 154(b) by 27 days.

(21) Appl. No.: 17/309,219

(22) PCT Filed: Nov. 7, 2019

(86) PCT No.: PCT/US2019/060213
§ 371 (c)(1),
(2) Date: May 7, 2021

(87) PCT Pub. No.: WO2020/097295
PCT Pub. Date: May 14, 2020

(65) Prior Publication Data
US 2021/0397034 A1    Dec. 23, 2021

Related U.S. Application Data

(60) Provisional application No. 62/756,667, filed on Nov. 7, 2018.

(51) Int. Cl.
*G02F 1/137* (2006.01)
*G02F 1/01* (2006.01)
(Continued)

(52) U.S. Cl.
CPC ........ *G02F 1/13725* (2013.01); *G02F 1/0123* (2013.01); *G02F 1/13363* (2013.01); *G02F 1/13737* (2013.01); *G02F 1/17* (2013.01)

(58) Field of Classification Search
CPC ............... G02F 1/13725; G02F 1/0123; G02F 1/13737; G02F 1/17
See application file for complete search history.

(56) References Cited

U.S. PATENT DOCUMENTS

| 4,396,250 A | 8/1983 | Wada et al. |
| 5,032,007 A | 7/1991 | Silverstein et al. |
| (Continued) | | |

FOREIGN PATENT DOCUMENTS

| CN | 103718094 A | * | 4/2014 | ......... G02F 1/13471 |
| EP | 0388976 A2 | | 9/1990 | |

OTHER PUBLICATIONS

International Search Report and Written Opinion dated Jan. 29, 2020, for International Patent Application No. PCT/US2019/060213. Shane Thomas, Authorized Officer. Forms PCT/ISA/210 and PCT/ISA/237. Nine pages.

*Primary Examiner* — Paul C Lee
(74) *Attorney, Agent, or Firm* — Vorys, Sater, Seymour and Pease LLP; Jacob Busch

(57) ABSTRACT

Disclosed is an optical assembly having a first variable transmission layer comprising a first electro-optically active material between a first pair of substrates, a second variable transmission layer comprising a second electro-optically active material between a second pair of substrates, and an electronically switchable birefringent layer, that is capable of altering the phase of incident light, situated between the first and second variable transmission layers. The layers are arranged such that light passing through the optical assembly can be altered based on the voltage applied to each layer. The light transmission levels can be altered between maximally transmissive, minimally transmissive, and semi-transparent levels between the maximally and minimally transmissive levels.

31 Claims, 8 Drawing Sheets

(51) Int. Cl.
  *G02F 1/13363*   (2006.01)
  *G02F 1/17*      (2019.01)

(56) References Cited

U.S. PATENT DOCUMENTS

| | | |
|---|---|---|
| 6,532,049 B1 | 3/2003 | Li et al. |
| 6,977,695 B2 | 12/2005 | Faris et al. |
| 7,057,683 B2 | 6/2006 | Udaka et al. |
| 7,088,413 B2 | 8/2006 | Martinot-Lagarde et al. |
| 9,933,631 B2 | 4/2018 | Osterman et al. |
| 2012/0242924 A1 | 9/2012 | Galstian |
| 2012/0327331 A1* | 12/2012 | Yim ...................... G02F 1/1362 349/62 |
| 2014/0022619 A1* | 1/2014 | Woodgate .......... G02B 27/0093 359/240 |

* cited by examiner

VARIABLE TRANSMISSION OPTICAL ASSEMBLY HAVING A PIXELATED SWITCHABLE BIREFRINGENT LAYER

CROSS-REFERENCE TO RELATED APPLICATIONS

This application claims priority to International Patent Application No. PCT/US2019/060213 filed Nov. 7, 2019, and U.S. Provisional Patent Application Ser. No. 62/756,667 filed Nov. 7, 2018, the entire disclosures of which are fully incorporated herein by reference in their entirety.

BACKGROUND

Virtual reality and augmented reality devices are of significant interest and as such have been the subject of much development. In virtual reality (VR), all light from the panoramic view is eliminated and substituted by the image from a display. These devices, such as those by Oculus™ or Microsoft™ are primarily used for gaming. They provide a realistic portrayal of the image but limit the ability of the user to move freely without hindrance (since users cannot see anything other than the displayed image). They are also known to cause motion sickness due to conflicting information reaching the brain from the different senses. One solution to these issues is to allow the user the capability to see some of the ambient images. This, in principle, allows the user to process the different images while maintaining his/her orientation. These systems are referred to as augmented reality (AR) systems and project an image on the panoramic view. AR systems such as marketed and sold by Google™ or Magic Leap™ are marketed as devices to enhance performance by superimposing computer-generated virtual information together with a view of the real environment. The success of the product depends on many parameters, including field of view and image quality. The latter is dependent on the relative intensity between the image and the ambient lighting. Given that a primary goal of AR devices is to allow a user to seamlessly move around, it is expected that the intensity of ambient lighting may be subject to dramatic and rapid changes. A sudden increase in intensity (e.g. when walking into sunlight) can cause image washout which is unacceptable. There is currently no acceptable solution to the issue of ambient light management for AR and VR systems. At best, the user is provided with two lenses, a clear and a tinted lens that have to be chosen or switched depending on the current lighting condition. This solution, however, is very limiting and has reduced the usage of these systems in commercial settings. There is also a desire for a system that can perform AR and VR functions as needed (on demand).

Light management can be broadly divided into two categories: global and local dimming. In global dimming, the entire ambient scene's intensity is altered. This alteration can range from a simple change in overall transmission (e.g. tinting) to complete occlusion of light transmission (e.g. black-out). On the other hand, local dimming is centered on a region of the panoramic view. The goal in local dimming is to reduce or eliminate ambient lighting behind a projected image and provide additional image contrast as needed or occlude directional ambient light that may interfere with the image. Typically, the performance requirements such as response time for global and local dimming are different. For example, local dimming must be fast to keep up with movements of the user's head, eyes, or ambient lighting. Global dimming, on the other hand, can have a slower response but a high clear state transmission is desired. As such, light management systems have typically been designed to either address local or global dimming requirements. For example, local dimming using a conventional polarizer based twisted nematic is possible. However, these systems will result in low transmission even if dimming is not desired. Furthermore, they provide a constant polarization dependence in the system which can result in distortions when used in polarizer based applications such as when used in conjunction with a display. On the other hand, global dimming without the use of polarizers can be achieved with a variety of technologies. However, the operational speed for these technologies is too slow for use for local dimming.

Therefore, there is a need for a system that can provide local as well as global dimming. Therefore, a goal of the present invention is to provide global and local dimming capability to near-eye or transparent display systems in a single system.

Another goal is to provide fast transition between different transmission levels.

Additionally, it is desirable to provide a color neutral response for the dimming.

Additional considerations include providing the global and local dimming without significant degradation of the optical quality of the system.

SUMMARY OF INVENTION

Disclosed herein is a variable transmission optical assembly having a first variable transmission (VT1) layer having a first electro-optically active material between a first pair of substrates, a second variable transmission (VT2) layer having a second electro-optically active material between a second pair of substrates, and an electronically switchable birefringent (ESB) layer between the first and second VT layers. The ESB layer switches between a state where it alters the phase of incident light and a state where it does not alter the incident light, depending on applied voltage. The layers are arranged such that light passing through the first VT layer, a pixel of the birefringent ESB layer, and the second VT layer has a pixel transmission level that can be altered based on the voltage applied to each layer. The light transmission levels can be altered between maximally transmissive (also called "transparent"), minimally transmissive (or "dark"), and semi-transparent (partial between the maximally and minimally transmissive levels). In some examples, the semi-transparent level can be altered or fine-tuned, by application of various voltage levels, to have various transmission levels between the max and min transmissivity levels.

The first VT layer has a first area, the second VT layer has a second area, and the ESB layer is pixelated with each pixel having a pixel area. The first or second area of the first or second VT layer, respectively, can either have the same size as the area of each pixel in the ESB layer, or have a size larger than the area of each pixel in the ESB layer. In some embodiments, the VT layers can have a large area to provide "global" light variation, while the pixels of the ESB layer can provide varying light conditions to smaller areas or regions of the device. It should be noted that the word "pixel" is not limited to its definition in the traditional sense of pixelated displays, where the pixels are typically very small. Here, the ESB pixels may be of the traditional size, but in other embodiments, they may be larger and only used to provide areas of varying light transmission on a device.

In some embodiments, the pixels in the ESB layer have a non-uniform pattern.

Each of the first or second, or both, variable transmission (VT) layers may be selected to be either an absorptive layer or a reflective layer. In some embodiments, one VT layer may be absorptive and the other may be reflective.

In some embodiments, the first or second VT layer, or both, are a guest-host cell having a guest-host mixture or combination of a liquid crystal host and one or more guest-dichroic dyes. The guest-host mixture can be selected from: (a) a combination of one or more positive dichroic dyes with a positive dielectric anisotropy host, or (b) a combination of one or more positive dichroic dyes with a negative dielectric anisotropy host.

In some examples, the guest-host mixture has an order parameter that is greater than 0.6, or 0.7 or 0.8, or any number in between 0.6 and 0.8.

In some embodiments, the first or second VT layer or both have a d/p selected from: 0, <0.25, <0.5, <0.75, <1 or 1.

In some embodiments, the first or second VT layer, or both, has a nematic-isotropic transition temperature (TNI) of more than 45° C.

The first and the second VT layers can have various configurations, including: (a) a perpendicular configuration (liquid crystal cells designed to affect different polarizations of light that are at an angle to each other), (b) parallel configuration (liquid crystal cells designed to affect the same polarization of light). Other examples of different configurations include: (c) guest-host liquid crystal cells wherein both layers comprise a positive anisotropy liquid crystal, (d) guest-host liquid crystal cells wherein both layers comprise a negative anisotropy liquid crystal, or (e) guest-host liquid crystal cells wherein one VT layer comprises a positive anisotropy liquid crystal and the other VT layer comprises a negative anisotropy liquid crystal.

The ESB layer can be selected from a positive liquid crystal whereby birefringence is maximum when no voltage is applied, or a negative liquid crystal whereby birefringence is maximum when a maximum voltage is applied.

In some embodiments, the first VT layer, the second VT layer or both have a broad band polarization (absorption/reflection) that is equal to or greater than 175 nm within a visible wavelength range of 400-700 nm. In other embodiments, the first VT layer, the second VT layer or both have a medium band polarization (absorption/reflection) that is less than 175 nm within a visible wavelength range of 400-700 nm.

The various switchable layers VT1, VT2 and ESB layers are operated independently. In some examples, however, the first and second VT layers may be operated together by simultaneous application of a voltage to both the first and second VT layers while the ESB layer pixels are operated independently.

The optical assembly is designed to have a response time as needed by the user and the changing ambient lighting environment. In some examples, the ESB layer can have a response time of less than 200 ms.

Depending on the application where the optical assembly is used, the substrates of the various layers may be, independently, made of traditional glass (such as, e.g., used in LCD and other optically clear devices) or made of a flexible material such as flexible glass or plastic.

The optical assembly, or each of the first or the second VT layer, may have light transmission levels that can alter between greater than 20% to 90%, or any number therebetween, in the maximally transmissive state; and below 50% to below 1% in the dark state, or any number therebetween, as long as there is a transmission window or swing of 30% or more between any chosen max and min transmissivity.

For example, the optical assembly may have a transmission of greater than 50% in the maximally transmissive state to less than 30% in the dark state, etc. In some embodiments, it may be desirable to shift the transmission window to a "more transparent" range (e.g. swing can be chosen to be from 90% in the max transmissivity state to 50% in the dark state, etc.). In other applications, it may be desirable to shift the transmission window to a "darker" range (e.g. swing can be from 45% 1% in the max transmissivity state to 1% in the dark state, etc.).

In some embodiments, the optical assembly can be configured to revert to a maximum transmissivity state when no voltage is applied. In other embodiments, the optical assembly can be designed to be in a minimally transmissive or dark state when no voltage is applied.

In some examples, the optical assembly includes a first guest-host liquid crystal cell having a first cell area, an electronically switchable pixelated birefringent layer capable of altering the phase of incident light, and a second guest-host liquid crystal cell having a second cell area, arranged such that light passing through the first guest-host cell, a pixel of the birefringent layer, and the second guest-host cell has a variable pixel transmission level that is varied between a maximum transmissive level, a minimum transmissive level and one or more semi-transmissive levels between the maximum and minimum transmissive levels. The variation in light transmission is achieved based on the voltage applied to each guest-host cell and the birefringent layer.

In some embodiments, the light transmission through the first and second cell areas are varied separately from light transmission through each pixel of the birefringent layer. In some examples, the pixels in the switchable pixelated birefringent layer have a non-uniform pattern.

The cell and birefringent layer configurations can be such that the pixel transmission level is at the maximum transmissive level when no voltage is applied. Alternatively, the configuration can be designed such that the pixel transmission level is at the minimum transmissive level when no voltage is applied.

In some examples, the first or the second guest-host liquid crystal cell, or both, are designed to have the following parameters: (i) a d/p of 0; (ii) a guest-host mixture with an order parameter equal to or greater than 0.78; (ii) substrates made from flexible glass or plastic; and/or (iii) a broad band absorption spectrum that is greater than 175 nm within a visible wavelength region of 400-700 nm.

DETAILED DESCRIPTION

Described herein is an optical assembly used for adjusting the level of light in an Optical Display Device (ODD) having a near eye or a transparent display. A near eye display refers to any lens or display placed close to the eye and worn by a user, such as a head-mounted display, an augmented reality (AR) or virtual reality (VR) device, a wearable computer or any other device worn by a user, including, for example, spectacle, goggle, visor, or head-up display (HUD) or head-mounted display (HMD) that has a displayed image capability. A transparent display refers to any device (whether worn by a user or not) where a user can view a surrounding environment and one or more displayed content simultaneously. Examples of transparent displays include transparent OLED displays, head-up displays (HUD), car windshield displays, transparent computer displays, etc. The Optical Display Device typically has a front lens or viewing area and other electronic components such as an integrated processor for handling content for display, an integrated image source for introducing the content to the optical assembly, a user interface, a control interface for running the various components of the device, a module for connection to an external device, etc. The integrated image source can contain a combiner, which is an optical element that allows the combination of a displayed image with the surrounding ambient vision or image. This combiner can be the image source itself such as seen in a see-through OLED display or an optical element that allows a projected image to be combined with panoramic vision. The latter is primarily used in AR systems.

The optical assembly described here (which may or may not be used as part of the combiner) is used to alter and vary the darkness or transmission level of one or more areas at the pixelated level and/or at the level of areas that cover several pixels, to cause dimming, thus achieving the goals enumerated above by allowing a high contrast ratio to be obtained without having to increase the brightness of the displayed image. The principles of the optical assembly are illustrated in FIGS. 1-7.

Figure 1:
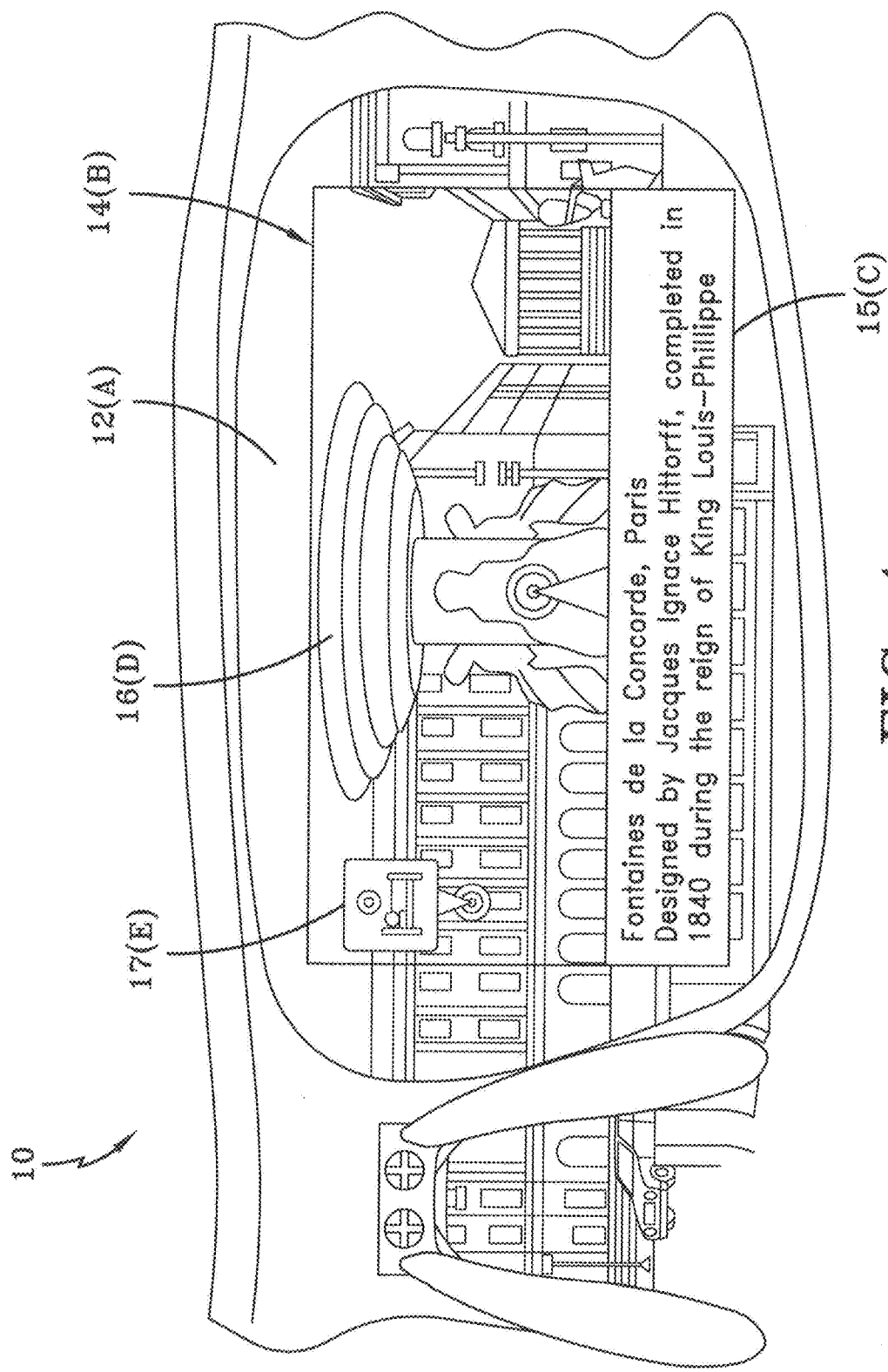
FIG. 1 depicts a typical augmented reality (AR) optical device viewing area.

FIG. 1 shows a typical transparent display of an AR device. An AR system is known to enhance information of a real environment by providing a visualization of overlaying computer-generated virtual information superimposed on a view of the real environment or a part of the real environment. The virtual information can be any type of visually perceivable data such as colored lights, objects, texts, drawings, videos, or their combination. The view of the real environment or the part of the real environment, as understood herein, could be perceived as visual impressions by direct vision and/or may be acquired as one or more images by a camera and projected or displayed on the viewing screen. Such a camera may be worn by the user or attached on a device held by the user or may be stand-alone. Although a head mounted AR device is depicted in FIG. 1, it will be appreciated that any Optical Display Device can be used.

In the example shown in FIG. 1, viewing screen 10 has a general viewing area 12 (A) having various display areas B (14), C (15), D (16), E (17), etc. that can separately have variable pixelated transmission. Any of these areas A, B, C, D, E, etc. can have a variable transmission as described below. It will be appreciated that each area may be electronically controlled independently of the others, or in combination with the others, as is required.

The dimmed area, whether within the display area or not, may be spatially oriented or controlled per the application being implemented. For instance, only a small portion of the display area may need to be altered/dimmed, such as when that portion of the display area deviates from some predetermined contrast ratio between the display portion of the display area and the surrounding environment. In some embodiments, portions of the lens may be altered in brightness, contrast, resolution, and the like, such as fixed to include the entire display area, adjusted to only a portion of the lens, adaptable and dynamic to changes in lighting conditions of the surrounding environment and/or the brightness-contrast of the displayed content, and the like. Spatial extent (e.g. the area affected by the alteration) and resolution (e.g. display optical resolution) may vary over different portions of the lens, including high resolution segments, low resolution segments, single pixel segments, and the like, where differing segments may be combined to achieve the viewing objectives of the application(s) being executed. In embodiments, technologies for implementing alterations of brightness, contrast, spatial extent, resolution, and the like, may include LCD technologies, embedded beads in the optics, flexible displays, suspension particle device (SPD) technologies, colloid technologies, and the like.

In addition, each area A-E, etc. (may have a different tint requirement that may be adjustable. For example, in some embodiments, there may be various modes of activation of the optical assembly layers. For example, the user may enter sunglass mode where the composite layers appear only somewhat darkened or the user may enter "Blackout" mode, where the composite layers appear completely blackened.

The various areas A, B, C, D, E, etc. can be operated independently of each other if so desired. The areas capable of variable transmission and containing the optical assembly of the invention may be the same size or smaller than the general viewing area 12 and may be larger or the same size as the display area 14, or 16, or 17 or a combination thereof. FIG. 1 shows only one example of the sized and special relationship of the areas, but any size, position, color, brightness, etc. can be used to achieve the results contemplated here.

The optical display device may use a projection display system, in which projection light emitted from a projection device is illuminated onto a semi-transmissive combiner via an optical element. This is the main mechanism in AR or HUD devices. However, other display means can also be used. For example, a see-through OLED display can be used to directly combine the image and panoramic views behind the display.

Figure 2:
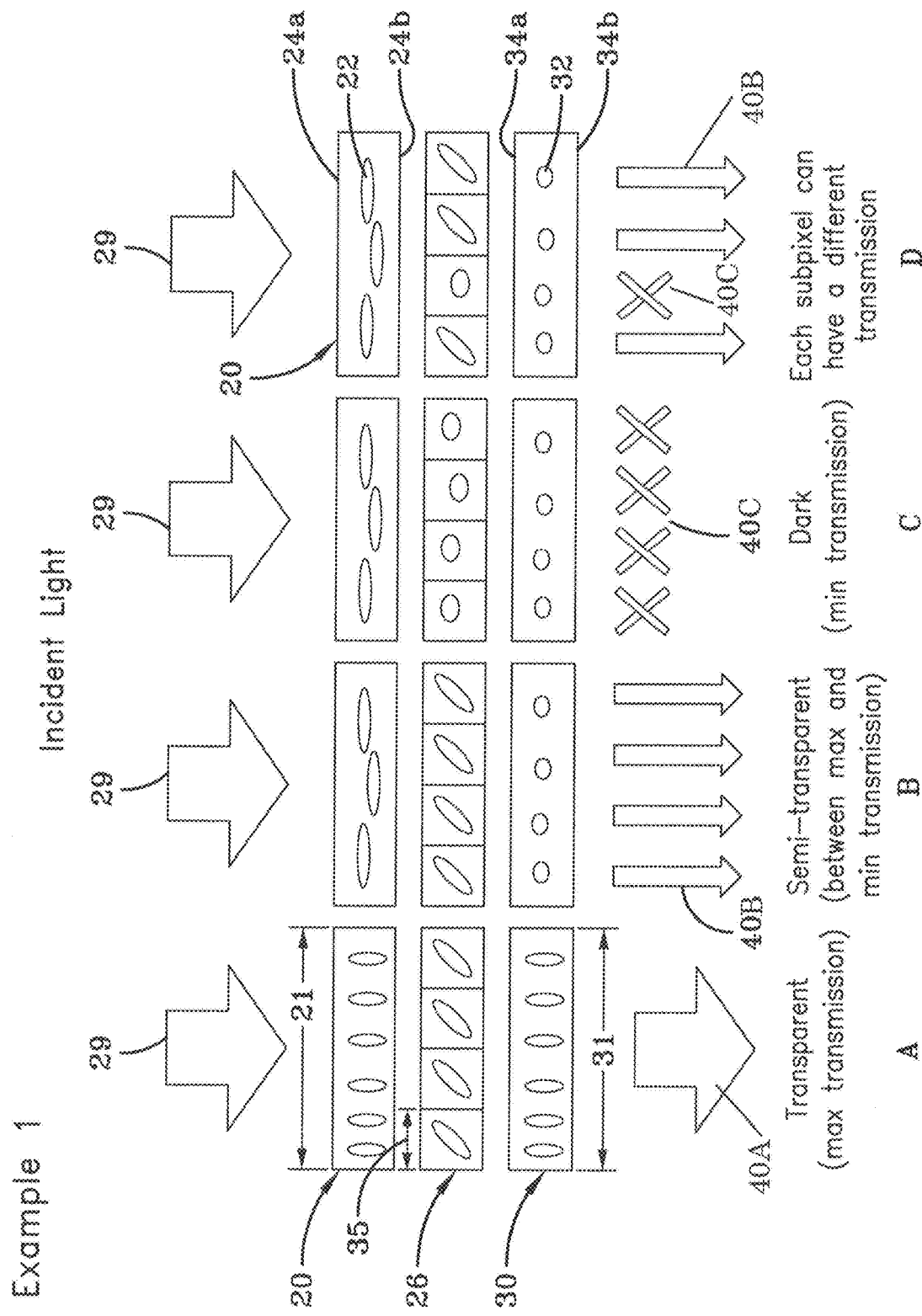
FIG. 2 is a schematic diagram of an example of an optical assembly according to the invention.

FIG. 2 is a schematic of the various active layers of one example of the optical assembly and how they vary light transmission at various levels, including at the pixel level. The optical assembly includes: A) a first variable polarizing (VT1) layer 20 having a first area 21 and comprising a first electro-optically active material (such as switchable guest-host liquid crystals or switchable cholesteric reflector) 22 between a first pair of substrates 24a,b; B) an electronically switchable birefringent (ESB) layer 26 which is "pixelated" (i.e. segmented into subareas 35), where the layer is capable of altering the phase and or polarization of incident light 29 based on an applied voltage; and C) a second variable polarizing (VT2) layer 30 having a second area 31 and comprising a second electro-optically active material (such as switchable guest-host liquid crystals or switchable reflective polarizer 32) between a second pair of substrates 34a,b.

Figure 3:
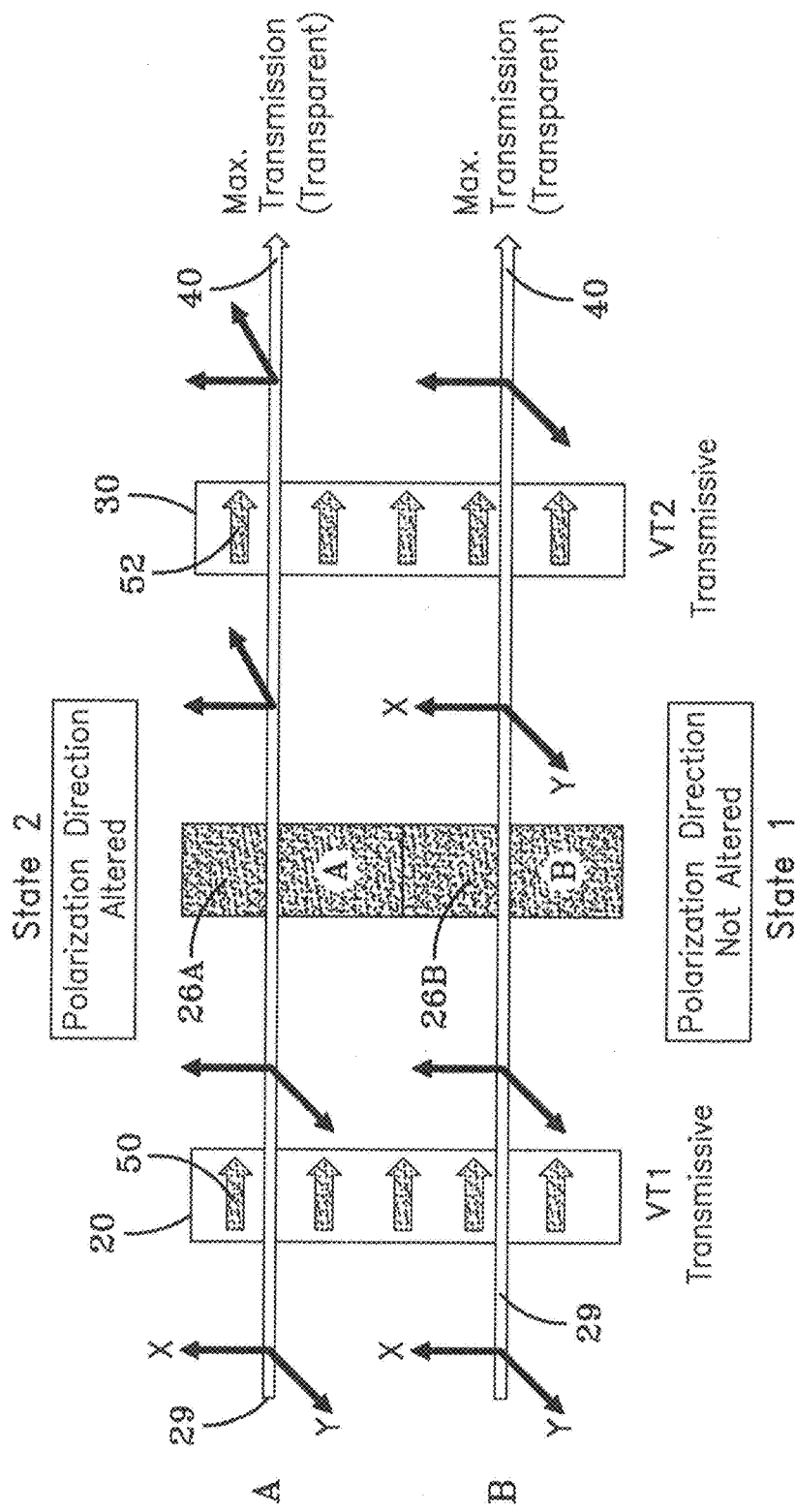
FIG. 3 is a schematic diagram of an example of how an optical assembly operates to vary light transmission in a first configuration.

Each pixel in the ESB layer has an area 35. The optical assembly is configured so that incident light 29 passing through the first VT layer, a single pixel of the birefringent layer, and the second VT layer has a pixel transmission level 40 that can be altered based on the voltage applied to each active layer. (FIGS. 2 and 3).

FIGS. 2-6 are schematic representations of different examples of the pixel transmission levels, i.e. level of transmission of light going through the VT1, a single pixel of the ESB layer, and VT2. The pixel transmission level 40 can be altered between a maximum transmissivity or transmission (referred also as "transparent"), a partial transmissivity or transmission (referred herein as "semi-transparent"), or a minimum transmissivity or transmission (referred herein as "dark"). For clarity, it is noted that maximum transmission (transparent) is limited by any insertion losses associated with the material and layers in the stack and not expected to be 100%.

Partial transmission refers to any transmission level between maximum and minimum and can be adjustable in various ways (e.g. stepwise or in a continuous fashion) through various predetermined levels by application of various pre-determined voltage levels to each of the layers (VT1, VT2 and ESB).

The variable transmittance layers VT1 (20) and VT2 (30) are electronically active and can each be selected from an absorptive layer, a reflective layer, or a combination thereof. Layers 20, 30 are configured to switch between a primarily "transmissive state", where both polarization directions of light are primarily transmitted, and an "absorptive/reflective state", where the layer will selectively absorb or reflect one polarization of incident light more than its orthogonal polarization.

An "absorptive polarizer" is a polarizer that will primarily absorb a selected polarization of light more than the other. An absorptive linear polarizer will have two propagation eigen modes referred to herein as "axes", an absorptive axis and a transmissive axis, which are orthogonal to each other. The polarization of the light that is aligned with the absorptive axis is absorbed more than the perpendicular polarization. In some examples the polarizer may be designed/configured to be wavelength dependent.

For example, an "absorptive linear polarizer with an axis in the x-direction" means that the polarizer will substantially absorb the x-direction polarization of light while substantially allowing y-polarization to propagate. Vice versa, an absorptive linear polarizer with an axis in the y-direction means that the polarizer will substantially selectively absorb y-polarized light and substantially transmit x-polarized light. In the examples depicted in the figures, we use X and Y for the first and second polarization directions (eigen modes) for ease of explanation, but it is understood that it may represent any polarization state (e.g. circular, elliptical, linear etc.). For example, absorptive circular polarizers exist and are typically constructed by using a linear polarizer in combination with a quarter wave retarder. Once light is polarized by the polarizer, the quarter wave plate induces a t/4 phase retardation which turns a linear polarization to a circular polarization.

A "reflective polarizer" is a polarizer that will reflect a selected polarization of light more than the other. For example, a "reflective polarizer with a reflective axis in the x-direction" means that the reflective polarizer will reflect the x-direction polarization of incident light more than the other y-direction polarization. Vice versa, a "reflective polarizer with a reflective axis in the y-direction" means that the reflective polarizer will reflect the y-direction polarization of incident light more than the other x-direction polarization. As in the case of absorptive polarizers, we use X and Y for the first and second polarization states for ease of explanation, but any polarization states can be used (e.g. circular, elliptical, linear, etc.).

An "active polarizer" refers to a polarizer that will alter its absorption and/or reflection of the selected polarization of light depending on an applied voltage. For example, when in an unenergized or non-active state (V=0), the polarizer will not substantially absorb or reflect either polarization and will transmit light of either polarization. Application of a voltage will then engage the polarization characteristics of the device. Alternatively, the device can be a polarizer in the un-energized (V=0) state and transmissive when a voltage is applied, i.e. application of a voltage reduces the polarizing capability of the device.

The polarization level of the active polarizer is selected by controlling the voltage applied to the active polarizer. The device carrying the optical assembly can further include a controller for application of voltage to each active layer of the device. Furthermore, each VT can be switched independently to provide intermediate transmission or polarization control.

The electronically switchable birefringence (ESB) layer is an "active polarization rotator/retarder" is capable to alter the polarization state of an incident light depending on an applied voltage. The ESB can be configured to alter the polarization state of the incoming light upon application of the field, or conversely it can perform this task in the absence of the field. In some examples, only a selected wavelength region of the light may be affected (a wavelength region refers to a region within the visible spectrum and may be narrow (essentially one color) medium (<175 nm) or broad (equal to or greater than 175 nm). Thus, for example, an x-direction polarized light entering the polarizer rotator will be turned into a y-direction polarized light before exiting the rotator, and vice versa, a y-direction polarization will be turned into an x-direction polarized light when a maximum voltage is applied. In that case, the fully activated ESB described herein will maximize phase retardation and rotate the polarization direction of the light by 90°, and as such, acts like a half wave, ½λ plate. Application of voltages less than fully activated voltage may result in partial polarization rotation/retardation (less than 90°). Alternatively, in some examples, application of maximum voltage will result in reduction of phase retardation. In that case, upon application of the voltage, a light propagating through the ESB will exit with the same polarization as it entered. As before, it should be noted that X and Y can mean circular polarization as well as linear or elliptical. In case of circular polarization, the first and second polarization states refer to right or left handed states. As described herein, the ESB may function in different ways: in some examples, phase retardation and/or polarization rotation occurs when the ESB is in the energized state (i.e. voltage is applied), in other examples, this occurs when the ESB layer is in an unenergized (non-activated, no voltage applied) state.

An electrically switchable birefringence element includes liquid crystal modes including, without limitation, in-plane switching (IPS), vertical alignment (VA), twisted nematic (TN), super twisted nematic (STN), pi cell, ferro-electric, blue phase, and ECB devices.

A controller coupled with the active polarization rotator alters the amount of one polarization direction with respect to the other. In the extreme case, the polarization would be switched from one state to the orthogonal state. However, intermediate states can be achieved by using voltages which are between the zero and max voltage states.

The level of light transmission in each layer can be controlled automatically, manually, remotely or with a combination thereof.

As stated before, the terms "x" and "y" direction polarization are arbitrary and refer to a first and second polarization direction of light which are orthogonal to each other and can be linear, circular, or elliptical. They are used, instead of stating for example a "first" and a "second" polarization direction only to simplify the description of the invention do not refer to any fixed values of direction. Furthermore, we use terms such as parallel and perpendicular to describe the two orthogonal eigen modes which can be circular and elliptical as well as linear. These terms, parallel and perpendicular, are also used in the same sense to describe the response of the polarizers to the incident polarization state.

Various liquid crystal configurations in the VT and ESB layers can be used to attain the different transmission levels. FIG. 2 shows a non-limiting example of achieving various transmission states where the VT1 and VT2 layers are perpendicular to each other.

In state A, layers 20 and 30 are both in a transmissive state. The ESB layer 26 is in a configuration that rotates the polarization direction of light by 90°. In this case, light 29 passes through VT1 layer 20, ESB layer 26 and VT2 layer 30 without any significant absorption or reflection and thus the layers have maximum transmissivity (light emerges with max transmission 40A).

In state B, layer 20 is switched to be in an absorptive/reflective state for one polarization direction (e.g. x direction) while layer 30 is switched to be in an absorptive/reflective state for the other polarization direction (e.g. y direction). The ESB layer 26 is rotating the light by 90°. Light 29 first passes through layer 20, which absorbs or reflects the x polarization direction and substantially transmits the y polarization. This then passes through ESB layer 26, which rotates the remaining polarization direction by 90°, e.g. turns the y direction to x direction. The x direction light passes through layer 30 with substantially no absorption or reflection, so the emerging light 40B will have a transmission level between maximum and minimum. (semi-transparent state).

In state C, layers 20 and 30 are as they were in state B, but the ESB pixels 26 are now switched to not alter the polarization direction of light. Therefore, when light 29 passes through layer 20, its x polarization is absorbed/reflected, the emerging y polarization is unaltered as it goes through layer 26, and so layer 30 absorbs/reflects the y polarization direction, thus resulting in only minimum light to emerge. Therefore, the layers allow only minimal transmission of light 40C (dark state).

In state D, the figure shows how altering the state of the ESB pixels 26 between a rotating state to a non-rotating state can alter the transmission of light through each pixel (area 35) between semi-transparent 40B to dark 40C. By switching the VT layers 20 and 30, light transmission through areas 21, 31 can be controlled separately.

It should be noted that other examples are possible, with the VT layers being parallel (see below), or having different configurations to be absorptive or reflective, or a combination. And the various layers can be switched upon either application of voltage, or removal of voltage, depending on their configuration. It should also be noted that transmission levels between the fully transmissive, the dark or the semi-transparent states are possible based on voltage levels applied.

Some examples are shown in FIGS. 3-6. Configuration 1 depicts an example where the VT1 (20) and VT2 (30) layers are predominately parallel (i.e. affect the same polarization direction of light). Configuration 2 depicts an example where the VT1 and VT2 layers are predominately perpendicular and so affect orthogonal polarization states of the light.

FIG. 3 shows an example of configuration 1 or parallel for VT1 (20) and VT2 (30) layers with two possible configurations A and B for ESB layer (26). In this example, layers 20 and 30 are selected so as not to absorb any polarization direction of light (transmissive state). Note that the minimal absorption or transmissive state can be achieved either when no voltage is applied (V=0) or when there is applied voltage (V=1) based on the chosen configuration of the VT layer.

The ESB layer 26 is shown to have one of two configurations: in configuration A, the ESB rotates the phase or polarization direction of light (State 2); in configuration B, the ESB layer does not alter the polarization direction of light (State 1). Note again that different ESB devices can be employed and designed such that either the ESB layer 26 is in State 1 when voltage is applied, or it is in State 2 when voltage is applied.

As shown in FIG. 3, when light 29 passes through layer 20 (VT1) and layer 30 (VT2), neither polarization is selectively absorbed or reflected, so whether the ESB layer is configured in State 1 (no change) or State 2 (rotation), the light will emerge having substantially both polarizations equally (maximum transmission).

Figure 4:
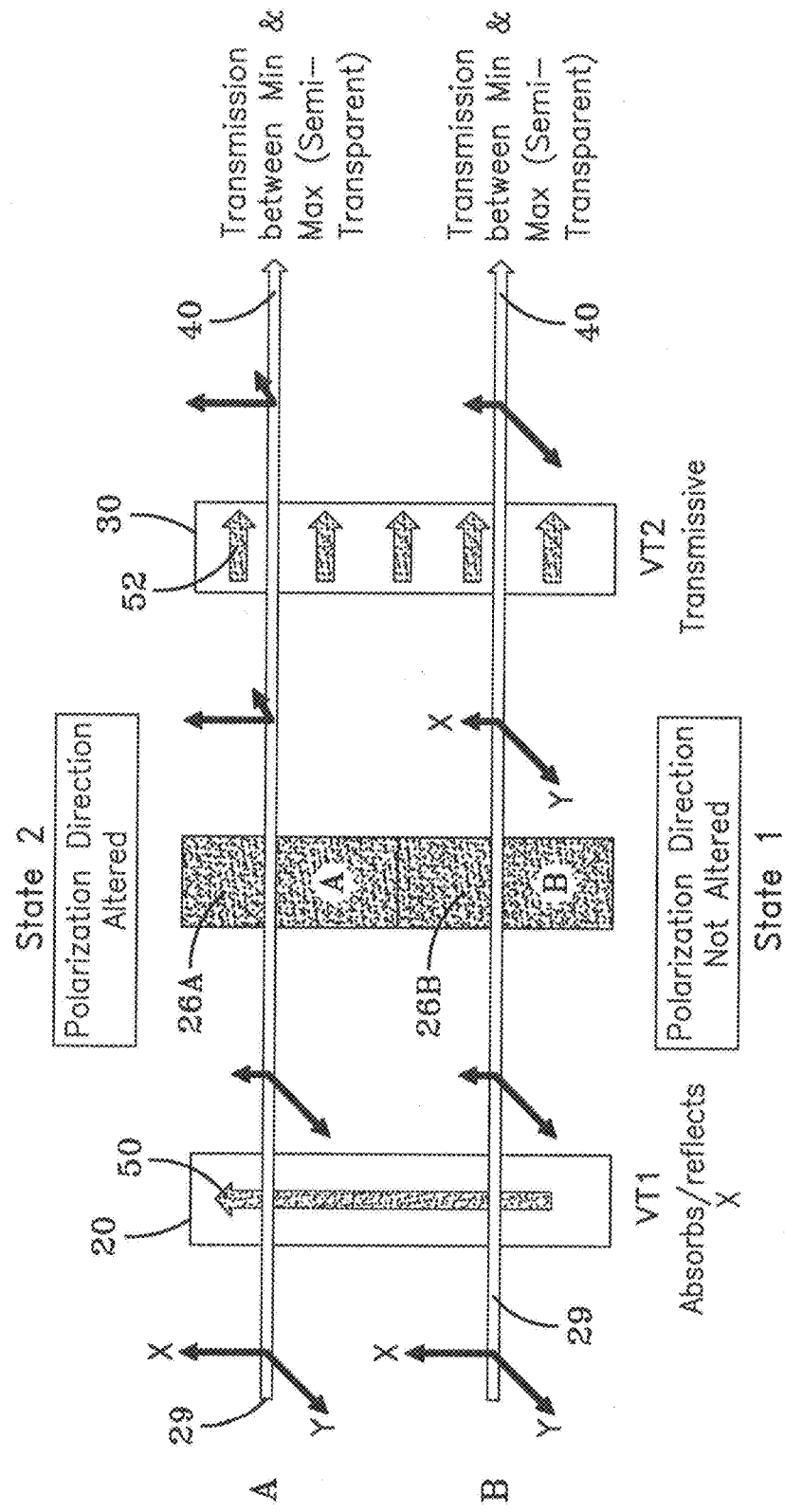
FIG. 4 is a schematic diagram of the first configuration where one of the variable transmission (VT) layers is in an absorptive/reflective state.

FIG. 4 shows an example of the VT layers still in configuration 1 (parallel) where layer 20 (VT1) is switched to and absorptive or reflective state, i.e. VT1 is switched to absorb or reflect one polarization direction of light (here shown as direction X). In this case, where incident light 29 enters the optical assembly, both in the case where the ESB layer 26 is configured to rotate light (state 2 shown in FIG. 4(A)), or configured not to change the polarization of light (state 1 shown in FIG. 4(B)), the light that exits the optical assembly will have a semi-transparent transmission level with one polarization direction reduced (due to absorption or reflection by VT1 layer 20) and the other polarization direction substantially intact. The amount of absorption or reflection of the one polarization direction (X) can be varied depending on the applied voltage. Thus, in some examples, the semi-transparent condition can be variable depending on the desired amount of light transmission that is desired.

Figure 5:
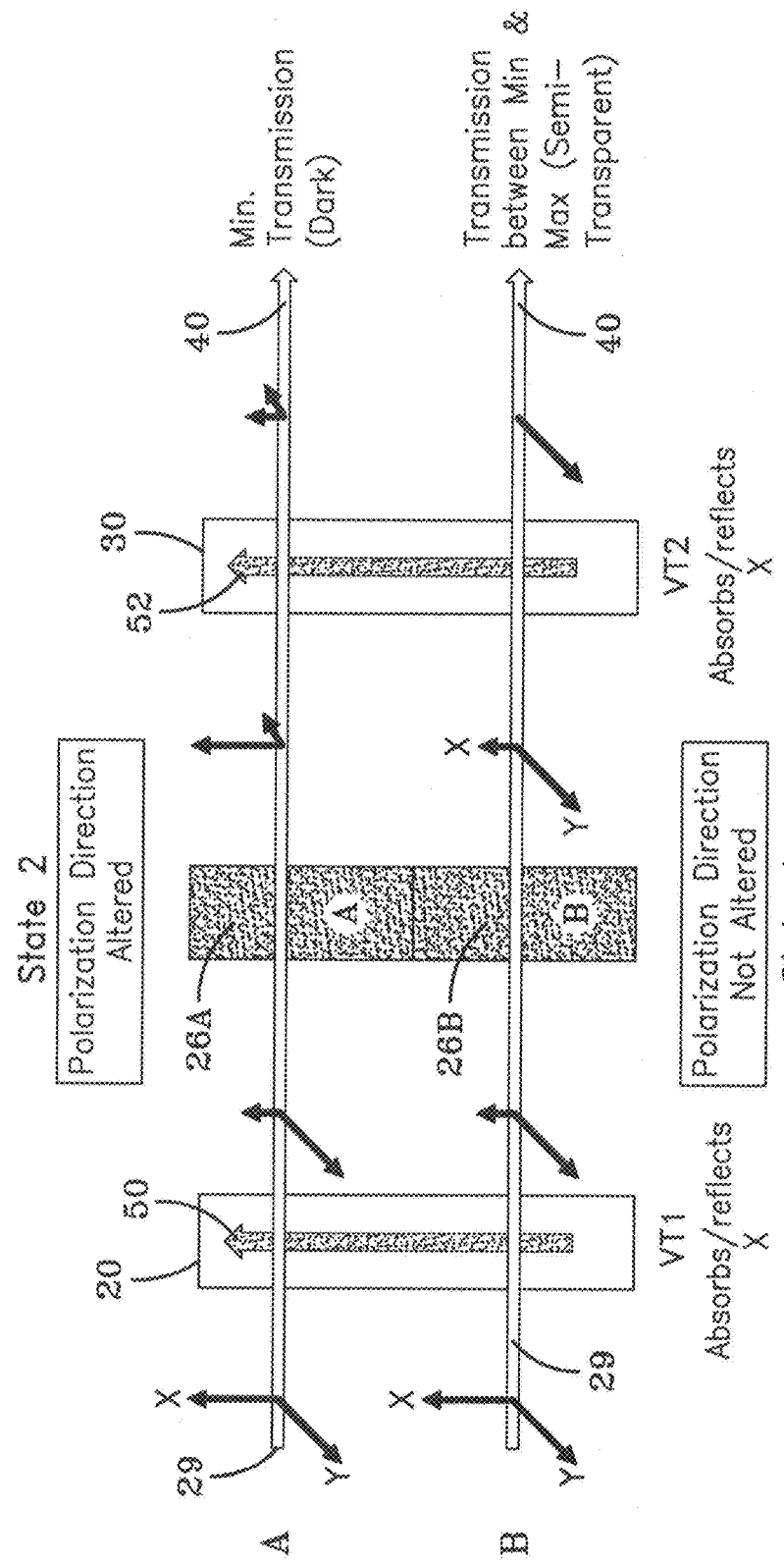
FIG. 5 is a schematic diagram of the first configuration where both of the VT layers are in an absorptive/reflective state.

FIG. 5 shows an example of the VT layers in configuration 1 (parallel) where both VT layers are switched to and absorptive or reflective state (here shown as direction X). It should be noted that depending on the desired configuration of the VT layers, the absorptive/reflective state can be achieved when voltage is applied (ON state), or, in alternative embodiments, it can be achieved when there is no applied voltage (OFF state). Incident light 29 having both X and Y polarization direction encounters VT1 (20), which absorbs or reflects the X polarization direction of light.

In the example shown in FIG. 5(A), the ESB layer 26 is in state 2 so it is configured to rotate the polarization direction of light. Thus, the reduced X direction is rotated to be in the Y direction, and the unchanged Y-direction is rotated to be in the X direction. When this light encounters VT2 (30), the X direction of light is again either absorbed or reflected by VT2. The resultant light exiting the optical assembly is therefore further reduced because both polarization directions of incident light are ultimately either absorbed or reflected. The exiting light in this case has minimum transmission (dark). (Note, the amount of absorption or reflection can be varied by application of a desired amount of voltage).

In FIG. 5(B), the ESB layer 26 is in state 1, so it does not alter the polarization direction of light. In this case, the X polarization direction of incident light 29 is absorbed by VT1 (20), then the light goes through ESB layer 26 unchanged. VT2 (30) is also configured to absorb the X polarization direction of light, so the Y polarization direction passes through VT2 substantially unchanged. The exiting light in this case has a semi-transparent transmission level because only one polarization direction in reduced.

Figure 6:
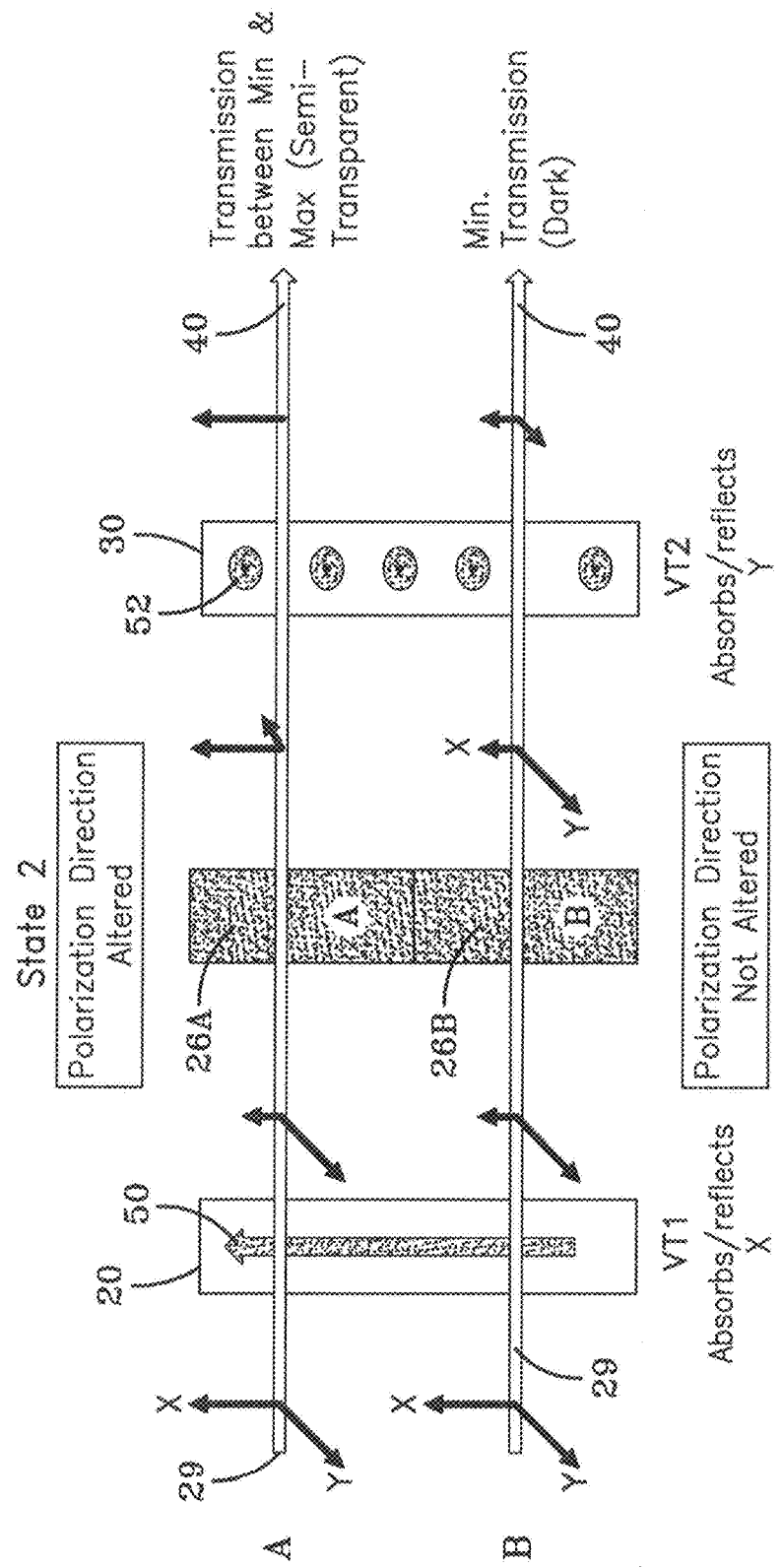
FIG. 6 is a schematic diagram of a second configuration of an optical assembly according to the invention.

FIG. 6 shows an example of the VT layers in configuration 2 where they are orthogonal to each other. In FIG. 6, layer 20 (VT1) has an X polarization axis and is shown to be in an absorptive or reflective state (absorbing/reflecting X polarization direction of light) and VT2 (30) has an Y polarization axis and is shown to be in an absorptive or reflective state (absorbing/reflecting Y polarization direction of light). In this case where the ESB layer 26 is configured to be in state 2-rotation (FIG. 6(A)), the exiting light will be semi-transparent where only one polarization axis is absorbed or reflected. Where the ESB is in state 1-no change (FIG. 6(B)), the exiting light will be minimally transmitted (dark) because both polarization directions will undergo absorption or reflection by VT1 and VT2. Thus, the performance is opposite of that described in previous example.

In the examples above, it can be seen that whether the optical assembly has configuration 1 or 2, it is possible to switch the layers VT1 (20), VT2 (30) and ESB (26) independently to various states so as to control and vary the amount of transmission of light through each pixel (pixel transmission level 40) to be either maximal, minimal, or in a state of semi-transparent level in between minimum and maximum, which itself can be varied depending on the voltage value supplied to the various layers. Thus, by varying the level of applied voltage to layers 20, 26 or 30, individually or in certain combinations, the pixel transmission level 40, as well as the polarization direction of the transmitted light, can be further tuned and altered to any state in between the three states of transparent, semi-transparent and dark.

In some embodiments, the optical assembly can have a carrier (for carrying the layers) made of glass or made of a flexible or rigid plastic material or any other suitable carrier.

In some embodiments, two or all of the layers 20, 26 and 30 are laminated together using an adhesive. The layers may be adjacent each other (i.e. with no other intervening layers or materials) or there may be one or more other layers in between each two layers of the optical assembly.

VT Layers

The variable transmittance layers VT1 and VT2 are electronically active and can be selected from an absorptive polarizer, a reflective polarizer, or a combination thereof.

A polarizer is an optical filter wherein the light transmission depends strongly on the polarization state of the incident light. In a polarizer, light with linear (or circular) polarization in a certain direction (handedness) is passed, and light polarized in an orthogonal (or opposite handedness) direction is either absorbed (absorptive) or sent to a different direction (reflective).

Examples of an active absorptive layer that can be used include devices such as a guest-host liquid crystal cells which are configured to have dichroism and the absorption of light by the GH cell is dependent on the polarization direction of the incident light.

Examples of a reflective layer include reflective LC devices such as Cholesteric liquid crystals (CLC) or stretched PDL reflective polarizers, or other switchable dielectric stacks. For example, U.S. Pat. No. 6,977,695 (Faris et al.) and U.S. Pat. No. 6,532,049 (Li et al.) describe various examples of switchable CLC circular polarizers, including polymerizable CLCs, PDLCs, etc.

Generally, liquid crystal VT layers include a liquid crystal cell having a pair of substrates with transparent conductors such as ITO, conductive polymer, silver nanowires or alike having a substantially constant gap there between and sealed around the periphery with a border seal, and one or more liquid crystal materials (with or without one or more dye materials, see below) sandwiched between the transparent substrates. The gap between the substrates (typically of 3-100 µm, preferably 3-20 µm) is maintained by spacers. The substrates may be additionally coated with an alignment layer, such as a polyimide polymer, etc. →Each VT layer cell has an area 21. In some embodiments, the VT layer is pixelated and has a pixel electrode group disposed in a matrix formed by a transparent electrode on at least one of the pair of transparent substrates to allow for direct or actively or passively multiplexed driven system.

The pixel size or area (21, 31) of the VT layers can be the same or different from each other, and each can be the same or different than the ESB pixel area 35. In some examples, the VT pixel area (21, 31) is larger than the ESB pixel area 35. In some examples, each VT cell area 21, 31 is the size of the entire display area in each area A, B, C, D, etc, as seen in FIG. 1.

Several configurations or combinations of the various layers is possible. Some examples include:

a. the VT1 and VT2 layers can be configured to affect different polarizations of light (e.g. P and S polarization, or R and L circular polarization, linear polarization, elliptical polarization, etc. or a combination thereof). For example, the LC molecular direction can be at an angle to each other. FIGS. 2 and 6 shows an angle of 90° between the VT1 and VT2, so they affect polarizations of light at 90° to each other.

b. the VT1 and VT2 layers are designed to affect the same polarization of light (e.g. are parallel). FIGS. 3-5 show VT1 and VT2 in parallel configuration.

The VT layer is powered or switched by means of a voltage drive unit that is configured to apply voltage to the LC cell, or each pixelated area, to control the transmission level of the VT layer cell areas as desired. In some examples, where the area of the VT cell(s) (21, 31) is larger than the area of each ESB pixel (35) to reduce alignment and manufacturing complexity. Using the optical assembly, the darkness or transmission level can be altered at the level of each pixel, allowing a high contrast ratio to be obtained with a relatively low drive voltage for the display.

As mentioned above, the VT layers are electronically active and can be either absorptive or reflective.

An example of an absorptive type layer is liquid crystal having a guest-host material that includes a combination of one or more liquid crystals as the host and one or more dyes as the guest-dye material. The dye-material can be a dichroic dye with a positive or negative dielectric anisotropy. A dichroic dye is an organic molecule (or mixture of molecules) whose absorption of polarized light strongly depends on the angle between the polarization and the absorption dipole in the molecule. In a positive dye, the dipole moment of the dye is substantially parallel to the long axis of the dye.

In a negative dye, the dipole moment of the dye is substantially perpendicular to the long axis of the dye. Therefore, a dichroic dye that has positive dichroism is one in which a maximal absorption occurs when the polarization is substantially parallel to the long axis of the dye molecule and a minimal absorption occurs when the polarization is perpendicular to the long axis. Similarly, a dichroic dye with negative dichroic anisotropy or dichroism, on the other hand, operates such that it has maximal absorption when the polarization is perpendicular to the long molecular axis of the dye molecule and minimal absorption when the polarization is parallel to the long axis of the dye.

In a guest-host system, the dichroic dyes align themselves according to the orientation direction of the long axes of the liquid crystal molecules (director). The orientation direction of the LC molecules at a state depend on the type of LC used (positive or negative anisotropy), the surface treatment, if necessary, such as rubbing direction or the like (homeotropic or planar) and the voltage applied. Various combination of LC and dichroic dyes are well known and any particular combination can be obtained depending on the desirable characteristics of the optical assembly.

Figure 7A:
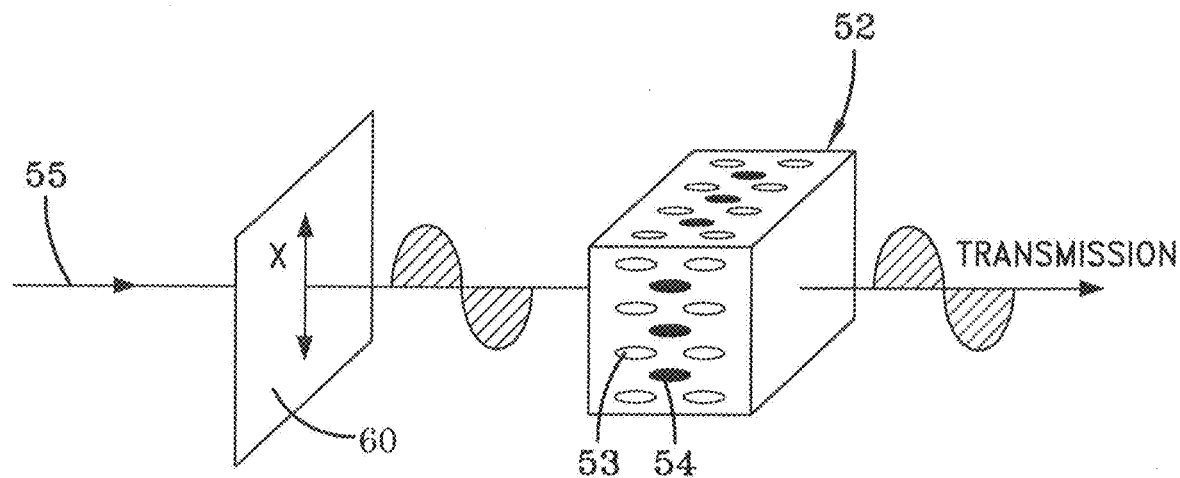
FIG. 7 is a schematic diagram of a guest-host cell in a transmissive (A) or absorptive (B) state.
Figure 7B:
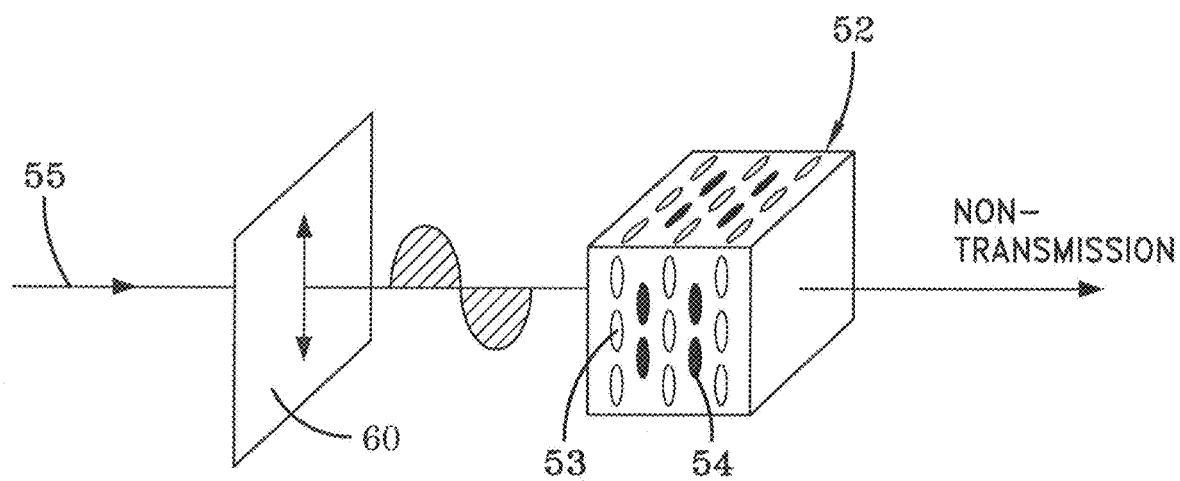

FIG. 7 shows one example of an absorptive guest-dye LC cell 52, where the cell includes a negative LC host combined with a positive dichroic dye in a homeotropic aligned cell and is therefore transmissive when there is no voltage applied. In the example depicted, FIG. 7A shows the inactive (no voltage applied) state of the guest-host cell 52, where the LC molecules 53 are orientated in the direction of the electric field. The positive dye molecules 54 align with the long axis of the LC molecules 53. In this state, light 55 (having polarization direction 60 or X) will pass through the cell 52 with substantially no change. Upon application of a voltage (FIG. 7B), the LC molecules 53 and the dye molecules 54 orient to be perpendicular to the applied field and absorb the polarization direction 60 of light 55. In some examples, the liquid crystal-dye mixture or configuration is designed so as to absorb one polarization of light more than double that of the other polarization.

Alternatively, a positive dielectric anisotropy LC can be used with positive dichroic dyes in a planar aligned cell. In this case, the maximum transmission occurs in the energized state. It will be appreciated that the cell can have one or more intermediate absorptive states, where the absorption of the light is intermediate between minimum and maximum transmission, based on voltage level. In these cases, the VT layers are variable or switchable polarizers, which are known in the art. As in the previous case, in some examples, the liquid crystal-dye mixture or configuration are designed so as to absorb one polarization of light more than double that of the other polarization.

Other types of LC and dye can be used, achieving different characteristics, e.g. the VT1 and VT2 layers can be configured to have the same configurations, absorbance polarization, anisotropy (negative or positive), type of dye, type of LC, or may be configured differently from each other. Possible examples are:

a. the VT1 and VT2 layers can be guest-host based where one or both layers comprise a positive anisotropy LC (absorb light at V=0 and transmit light when energized), b. the VT1 and VT2 layers are guest-host based where one or both layers comprise a negative anisotropy LC (transmit light at V=0 and absorb light when energized, resulting in a device that is "fail-safe" where in the event that no voltage is present, the device is maximally transmissive), c. the VT1 and VT2 layers are guest-host based where one layer comprises a positive anisotropy LC and the other layer comprises a negative anisotropy LC. This configuration results in a partially fail-safe device where in the event that no voltage is present, the device is semi-transparent (e.g. allows transmission of about 50% of light)

In some examples, the guest-host material in either the VT1 layer, the VT2 layer, or both, can have other characteristics such as:

a. an order parameter (of the gust-host material) that is greater than 0.6. In other examples, the order parameter can be greater than 0.6, 0.7, 0.71, 0.72, 0.73, 0.74, 0.75, 0.76, 0.77, 0.78, 0.79 or 0.8;

b. a thickness to pitch ratio (d/p) of from 0-1 for a guest-host based VT layer. In some examples, the d/p is <1, or <0.75, or <0.5, or <0.25, or <0.1;

c. a nematic-isotropic transition temperature (TNI) of more than 45° C., 50° C., 60° C., 70° C., 80° C., 90° C., 100° C., or above;

d. a broad absorption or reflection band, defined as an absorption or reflection band that has a width equal to or greater than 175 nm, or greater than 200 nm, within a visible wavelength range of 400-700 nm (e.g. as disclosed in U.S. Pat. Nos. 9,134,551 & 9,513,524, the entire disclosures of which are incorporated herein by reference);

e. a medium absorption or reflection band that is less than 175 nm in width, or a narrow absorption/reflection band, for example, in a particular colored region of the spectrum (e.g. blue, green, or red);

In some examples, the liquid crystal host of one or both VT layers has an absolute dielectric anisotropy greater than 1, 2, 3, 4, 5, etc.

At least one of the substrates (24, 34) of the VT layers can include an alignment layer for aligning the liquid crystal molecules. In some embodiments, the first or the second or both VT layers have a pre-treated alignment layer so as to confer a pre-tilt to the liquid crystal host of between 2 and 40°.

In some embodiments, the liquid crystal host of one or both VT layers has a rotational viscosity less than 100, 200, 300, 400 or 500 mPas, etc.

In some embodiments, the first VT layer, or the second VT layer, or both together, have a light transmission of greater than 20% in the transparent (max transmission) state. In other embodiments, the transmission is greater than 30%, 40%, 50%, 60%, 70%, 80% or 90% in its fully (max) transmissive state. In some examples, the transmission in the dark state (minimum transmission) is below 50%, 40%, 30%, 20%, 10%, 5% or 1%.

Each set of substrates (24a, b or 34 a, b) containing the electro-optic material in the VT layers may be made of glass (including flexible glass), flexible plastic, or a combination thereof.

For CLC based reflective polarizer it is expected that the pitch is tuned so that the reflection is within the visible band. The reflection band can be narrow (less than 175 nm) for selective reflection or broad (greater than 175 nm) for more neutral colors. The band can be electrically tuned or turned on and off as known in the art. The bandwidth of the reflection refers to the band width at the Applicant calls an "Aggregate Full Width at Half Maximum" (A-FWHM). A broad band reflection refers to one that has an A-FWHM that is greater than 175 nm, or in some embodiments, greater than 180 nm, 185 nm, 190 nm, 195 nm or 200 nm, where the entire spectral absorption band is contained within the range of visible wavelengths. An A-FWHM can be understood as follows: full width at half maximum (FWHM) is a measurement that characterizes the width of the absorption curve of the dye. It is defined as the distance between the cut-off points on the absorption curve, which occur where the absorption is one-half of the maximum absorption. Thus, regardless of the shape of the absorption curve, the FWHM is the width of the curve between the two cut-off points where the absorption is one-half of the maximum absorption.

The Electronically Controlled Birefringent (ESB) Layer

Birefringent ESB layers are known in the art and can be selected from: a twisted-nematic (TN), super twisted nematic (STN), vertical alignment (VA), a Pi cell, chiral, switchable waveplate, etc.

The electronically birefringent layer (ESB) can have a positive anisotropy LC, (e.g. ECB, TN), where birefringence is maximum when no voltage is applied. Alternatively, the ESB can have a negative anisotropy LC, i.e. having maximum birefringence when maximum voltage is applied.

The ESB response time can be different or the same as the response time of one or both of the VT layers. "Response time" is defined as the time between the rising edge of incident light and minimum transmittance (max darkness) of light through the ESB layer. In some examples, the ESB layer has a response time of less than 200 ms, or 150 ms, 100 ms, 80 ms, 60 ms, 40 ms, 20 ms, 16 ms, 8 ms, 4 ms, 2 ms, 1 ms.

In some examples, the pixelated area of the ESB layer has an irregular or non-uniform pattern. A "non-uniform pattern" as used herein means one or more of the following irregularities: pixels do not have the same size or dimension, the same shape, a regular shape (e.g. square) or are not regularly arranged, but rather have an irregular size, or shapes, or are irregularly arranged, or have non-uniform patterns or alignment, or a combination thereof, in a way that reduces or eliminates diffraction. Usually, in traditional displays, pixels are exactly the same size and shape and are meticulously aligned to preserve picture integrity. A common problem with regularly patterned pixelated displays is diffraction patterns of light due to the regular patterns. In some examples of the optical assembly described here, however, such regularity may not be required and having a non-uniform pattern may reduce diffraction patterns.

Electronics/Driving Voltage

During operation, in some examples, the voltage applied (amplitude, frequency, on or off) to the first VT1 layer, second VT2 layer or the ESB layer can all be independent of each other to have control over which areas or pixels have the desired transmission level. In some embodiments, voltage is applied to the two VT layers simultaneously and the ESB has a different voltage source that drives the pixels separately from each other, and separately from the VT layers.

Each layer (VT1, VT2, ESB) may be operated with an applied DC voltage or AC voltage as required.

In some embodiments, the conductive transparent electrode used in the ESB layer has a sheet resistance less than 2 KOhm/square.

In some embodiments, the voltage applied to the first and second VT layers is greater than or equal to 1, 2, 3, 4, or 5V, etc.

In some embodiments, the first VT layer, the second VT layer, or both are connected to a voltage source in more than one area.

EXAMPLE

Figure 8:
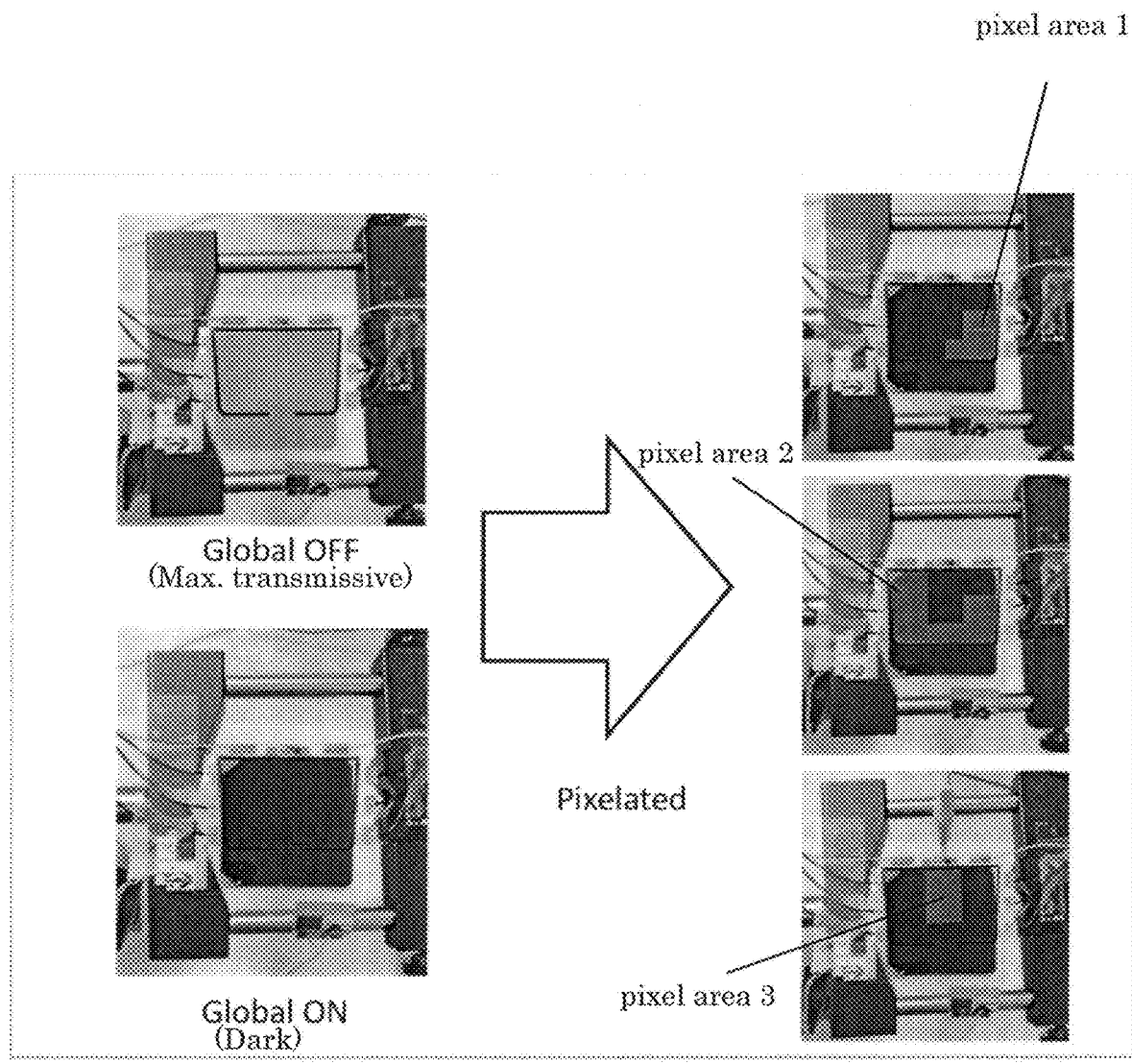
FIG. 8 shows photographs of an example of one embodiment of the optical assembly according to the invention.

FIG. 8 shows photographs of an example of an optical assembly device made with two guest-host cells as VT1 and VT2 which are perpendicular to each other (Configuration 2). The guest-host mixture used in both VT layers was AlphaMicron PAN-1 mixture with a negative LC host and a mixture of positive dichroic dyes with a d/p of zero and a wide band absorption of about 250 nm. Order parameter of the mixture was 0.8. The substrates for all layers comprised of flexible plastic (polycarbonate).

The ESB layer was made in a reverse TN configuration using negative liquid crystal in a homeotropic cell. The transmission window was 50% in the max transmissivity state (Global OFF) and 1% in the dark state (Global ON). Various pixels areas were designed that were capable of providing semi-transparent states between the max and the min transmissivity (pixel areas 1, 2 &3). With this particular configuration of LC cells, other examples can be made with a transmission window (or swing) of about 40% (e.g. going from a max transmissivity of 80% to a dark state of 40%, etc.)

Thus, it can be seen that the objects of the invention have been satisfied by the structure and its method for use presented above. While in accordance with the patent Statutes, only the best mode and preferred embodiment has been presented and described in detail. It is to be understood that the invention is not limited thereto and thereby. Accordingly, for an appreciation of the true scope and breadth of the invention, reference should be made to the following claims.

The invention claimed is:

1. A variable transmission optical assembly comprising:
a first variable transmission (VT) layer having a first cell area and comprising a first electro-optically active material between a first pair of substrates,
an electronically switchable birefringent (ESB) layer which is pixelated, said layer capable of altering the phase of incident light,
a second variable transmission (VT) layer having a second cell area and comprising a second electro-optically active material between a second pair of substrates,
wherein light passing through the first VT layer, a pixel of the birefringent layer, and the second VT layer has a pixel transmission level that can be altered based on the voltage applied to each layer.

2. The optical assembly of claim 1, wherein the pixel transmission level can be altered between the following levels:
a. a maximum transmissivity (transparent),
b. a partial transmissivity (semi-transparent),
c. a minimum transmissivity (dark).

3. The optical assembly of claim 1, wherein each said first VT layer or second VT layer, or both, are selected from an absorptive layer or a reflective layer.

4. The optical assembly of claim 1, wherein each said first or second VT layer or both comprise a guest-host mixture comprising a combination of a liquid crystal host and one or more guest-dyes.

5. The optical assembly of claim 4, wherein the guest-host mixture is selected from: (a) a combination of one or more positive dichroic dyes with a positive dielectric anisotropy host, or (b) a combination of one or more positive dichroic dyes with a negative dielectric anisotropy host.

6. The optical assembly of claim 4, wherein the guest-host mixture has an order parameter that is greater than 0.6.

7. The optical assembly of claim 4, wherein the first or second VT layer or both have a d/p selected from: 0, <0.25, <0.5, <0.75, <1 or 1.

8. The optical assembly of claim 1, wherein the first or second VT layer, or both, has a nematic-isotropic transition temperature (TNI) of more than 45° C.

9. The optical assembly of claim 1, wherein the first and the second VT layers have a configuration selected from:
   a. guest-host liquid crystal cells designed to affect different polarizations of light that are at an angle to each other,
   b. guest-host liquid crystal cells designed to affect the same polarization of light,
   c. guest-host liquid crystal cells wherein both layers comprise a positive anisotropy liquid crystal,
   d. guest-host liquid crystal cells wherein both layers comprise a negative anisotropy liquid crystal,
   e. guest-host liquid crystal cells wherein one VT layer comprises a positive anisotropy liquid crystal and the other VT layer comprises a negative anisotropy liquid crystal.

10. The optical assembly of claim 1, wherein the ESB layer is selected from:
   a. a positive liquid crystal whereby birefringence is maximum when no voltage is applied, or
   b. a negative liquid crystal whereby birefringence is maximum when a maximum voltage is applied.

11. The optical assembly of claim 1, wherein the first VT layer, the second VT layer or both have a broad band polarization that is greater than 175 nm within a visible wavelength range of 400-700 nm.

12. The optical assembly of claim 1, wherein the first VT layer, the second VT layer or both have a medium band polarization that is less than 175 nm within a visible wavelength range of 400-700 nm.

13. The optical assembly of claim 1, wherein each of the first or second cell areas, independently, is selected from:
   a. the same size as the area of each pixel in the ESB layer, or
   b. larger than the area of each pixel in the ESB layer.

14. The optical assembly of claim 1, wherein the pixels in the ESB layer have a non-uniform pattern.

15. The optical assembly of claim 1, wherein the first and second VT layers are operated together by simultaneous application of a voltage to both the first and second VT layers while the ESB layer pixels are operated independently.

16. The optical assembly of claim 1, wherein the ESB layer has a response time of less than 200 ms.

17. The optical assembly of claim 1, wherein at least one of the first VT layer, the second VT layer, or the ESB layer has flexible substrates comprising a flexible glass or plastic material.

18. The optical assembly of claim 1, wherein the first VT layer or the second VT layer, or both, has a light transmission of greater than 50% in the maximally transmissive state.

19. The optical assembly of claim 1, wherein the optical assembly has a light transmission of less than 30% in the dark state.

20. The optical assembly of claim 1, wherein the optical assembly reverts to a maximum transmissivity state when no voltage is applied.

21. An optical assembly comprising:
   a first guest-host liquid crystal cell having a first cell area,
   an electronically switchable pixelated birefringent layer, said birefringent layer capable of altering the phase of incident light,
   a second guest-host liquid crystal cell having a second cell area, wherein light passing through the first guest-host liquid crystal cell, a pixel of the switchable pixelated birefringent layer, and the second guest-host liquid crystal cell has a variable pixel transmission level that is varied based on a voltage applied to each guest-host liquid crystal cell or the switchable pixelated birefringent layer, and wherein said variable pixel transmission level varies between a maximum transmissive level, a minimum transmissive level and one or more semi-transmissive levels between said maximum and minimum transmissive levels.

22. The optical assembly of claim 21, wherein light transmission through the first cell area and the second cell area is varied separately from light transmission through each pixel of the switchable pixelated birefringent layer.

23. The optical assembly of claim 21, wherein the pixel transmission level is at the maximum transmissive level when no voltage is applied.

24. The optical assembly of claim 21, wherein the pixel transmission level is at the minimum transmissive level when no voltage is applied.

25. The optical assembly of claim 21, wherein the first or the second guest-host liquid crystal cell, or both, have a d/p of 0.

26. The optical assembly of claim 21, wherein the first or the second guest-host liquid crystal cell, or both, comprise a guest-host mixture with an order parameter equal to or greater than 0.78.

27. The optical assembly of claim 21, wherein the first or the second guest-host liquid crystal cell, or both, comprise flexible glass or plastic substrates.

28. The optical assembly of claim 21, wherein the first or the second guest-host liquid crystal cell, or both, have a broad band absorption spectrum that is greater than 175 nm within a visible wavelength region of 400-700 nm.

29. The optical assembly of claim 21, wherein the first and second cell areas, are larger than an area of a pixel in the switchable pixelated birefringent layer.

30. The optical assembly of claim 21, wherein the optical assembly has a maximum light transmission of greater than 80% and a minimum light transmission of less than 60%.

31. The optical assembly of claim 21, wherein the switchable pixelated birefringent layer has a non-uniform pattern of pixels.

* * * * *